(12) United States Patent
Lee (10) Patent No.: US 7,433,294 B2
(45) Date of Patent: Oct. 7, 2008

(54) METHOD OF AND APPARATUS FOR RECORDING DATA IN VARIOUS RECORDING FORMATS ON AN OPTICAL STORAGE MEDIUM, METHOD OF AND APPARATUS FOR REPRODUCING THE DATA, AND AN OPTICAL STORAGE MEDIUM ON WHICH THE DATA IS RECORDED

(75) Inventor: Sang-am Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 581 days.

(21) Appl. No.: 10/628,468

(22) Filed: Jul. 29, 2003

(65) Prior Publication Data

US 2004/0022519 A1 Feb. 5, 2004

(30) Foreign Application Priority Data

Aug. 5, 2002 (KR) ................ 2002-46174

(51) Int. Cl.
*G11B 7/24* (2006.01)
*G11B 7/20* (2006.01)

(52) U.S. Cl. .............. 369/275.1; 369/94; 386/131
(58) Field of Classification Search .......... None
See application file for complete search history.

(56) References Cited

U.S. PATENT DOCUMENTS

| | | | |
|---|---|---|---|
| 5,687,397 A | 11/1997 | Ohmori | |
| 5,754,248 A * | 5/1998 | Faroudja | 348/474 |
| 5,825,726 A * | 10/1998 | Hwang et al. | 369/30.05 |
| 6,038,208 A | 3/2000 | Shikunami et al. | |
| 6,122,436 A | 9/2000 | Okada et al. | |
| 6,128,264 A | 10/2000 | Tsutsui | |
| 6,205,112 B1 * | 3/2001 | Weidner | 369/275.3 |
| 6,243,343 B1 | 6/2001 | Ishimura et al. | |
| 6,449,227 B1 | 9/2002 | Heo | |
| 2005/0018574 A1 * | 1/2005 | Jenkins et al. | 369/53.21 |

FOREIGN PATENT DOCUMENTS

| | | |
|---|---|---|
| EP | 0685845 A2 | 12/1995 |
| EP | 0685845 A3 | 12/1995 |

(Continued)

OTHER PUBLICATIONS

Hungarian Search Report for Application No. P0302448 issued on Dec. 28, 2005.

(Continued)

*Primary Examiner*—Joseph Feild
*Assistant Examiner*—Parul Gupta
(74) *Attorney, Agent, or Firm*—Staas & Halsey LLP (57) ABSTRACT

A method of and an apparatus for recording data on an optical storage medium includes recording the data in a desired recording format regardless of the type of the optical storage medium. Accordingly, it is possible to record data in a recording format selected by a user. Also, since recording format information is recorded on the optical storage medium, it is possible to readily reproduce desired data from the optical storage medium in which data is recorded in various recording formats.

43 Claims, 5 Drawing Sheets

FOREIGN PATENT DOCUMENTS

| | | |
|---|---|---|
| EP | 0817195 A2 | 1/1998 |
| EP | 0817195 A3 | 5/2000 |
| EP | 1039450 | 9/2000 |
| EP | 1098303 | 5/2001 |
| JP | 03-266261 | 11/1991 |
| JP | 04-307472 | 10/1992 |
| JP | 05-325423 | 12/1993 |
| JP | 08-203210 | 8/1996 |
| JP | 10-051739 | 2/1998 |
| JP | 11-086453 | 3/1999 |
| JP | 11-134813 | 5/1999 |
| JP | 11-260043 | 9/1999 |
| JP | 2001-126407 | 5/2001 |
| JP | 2001-203971 | 7/2001 |
| JP | 2002-538567 | 11/2002 |
| KR | 2002-0027344 | 4/2002 |
| WO | 00-51121 | 8/2000 |
| WO | 00-62295 | 10/2000 |

OTHER PUBLICATIONS

Japanese Office Action for Application 2003-285934 issued on Dec. 20, 2005.
Korean Office Action with English Language Translation.
Japanese Office Action for Application No. 2003-285934; mailed Apr. 18, 2006.
Chinese Office Action for Application No. 03164982.3; dated Apr. 7, 2004.
European Search Report for corresponding European Patent Application No. 03254871 dated Mar. 26, 2008, 3 pgs (In English).

* cited by examiner

METHOD OF AND APPARATUS FOR RECORDING DATA IN VARIOUS RECORDING FORMATS ON AN OPTICAL STORAGE MEDIUM, METHOD OF AND APPARATUS FOR REPRODUCING THE DATA, AND AN OPTICAL STORAGE MEDIUM ON WHICH THE DATA IS RECORDED

CROSS-REFERENCE TO RELATED APPLICATION

This application claims the benefit of Korean Patent Application No. 2002-4174 filed on Aug. 5, 2002 in the Korean Intellectual Property Office, the disclosure of which is incorporated herein by reference.

BACKGROUND OF THE INVENTION

1. Field of the Invention

The present invention relates to a method of and apparatus for recording data on an optical storage medium, a method of and apparatus for reproducing the data, and an optical storage medium on which the data is recorded, and more particularly, to methods of recording data in various recording formats on an optical storage medium and reproducing the data, an optical disc recording/reproducing apparatus used when performing such methods, and an optical storage medium on which the data is recorded.

2. Description of the Related Art

Generally, an optical disc recording/reproducing apparatus records/reads data on/from an optical storage medium. There are various types of optical storage media, such as a CD-ROM, a CD-R/RW, a DVD-ROM, a DVD-R/W, and a DVD-RAM. Data can be recorded on or reproduced from these optical storage media using a CD-ROM drive, a CD recorder, a DVD-player, a DVD recorder, and a DVD-RAM drive, respectively.

Meanwhile, video and/or audio data must be recorded on an optical storage medium in a standard recording format prescribed by an international organization. A conventional optical disc recording apparatus records data on an optical storage medium in the same recording format selected according to the type of the optical storage medium. Also, a conventional optical disc reproducing apparatus only reproduces data recorded in the same recording format, determined according to the type of the optical storage medium. For instance, data needs to be recorded in a DVD-video format on a DVD-RW disc and recorded in a DVD-VR format on a DVD-RAM disc. Accordingly, data is recorded in a recording format suitable to the type of an optical storage medium when using the conventional optical disc recording apparatus.

In order to record data in different recording formats, a disc matching the various recording format and a recording circuit matching the disc are required. Also, a reproducing circuit is further required to reproduce the data recorded in a recording format suitable to the type of an optical storage medium.

SUMMARY OF THE INVENTION

The present invention provides methods of recording data in a desired recording format on an optical recording medium regardless of the type of the optical storage medium, and reproducing the data.

The present invention also provides methods of recording data in various recording formats on an optical storage medium, and reproducing the data.

The present invention also provides an optical disc recording/reproducing apparatus used when performing such methods.

The present invention also provides an optical storage medium on which data is recorded using such methods.

Additional aspects and advantages of the invention will be set forth in part in the description which follows and, in part, will be obvious from the description, or may be learned by practice of the invention.

According to an aspect of the present invention, a method of recording data on an optical storage medium in a certain recording format includes selecting a recording format to record the data on the optical storage medium, recording the data on the optical storage medium in the selected recording format, and adding information regarding the selected recording format on the optical storage medium.

According to another aspect of the present invention, a method of reproducing data from an optical storage medium in which data is recorded includes reading recording format information regarding desired data from an information area of the optical storage medium, and reproducing the desired data based on the recording format information.

According to yet another aspect of the present invention, a method of recording data on an optical storage medium in a plurality of recording formats includes selecting one of the plurality of recording formats for each data to record the data on the optical storage medium, recording the data on the optical storage medium in the selected recording format, and adding information regarding the selected recording format on the optical storage medium whenever each data is recorded in one of the selected recording formats.

According to still another aspect of the present invention, a method of reproducing data from an optical storage medium includes reading a file system from the optical storage medium, reading recording format information and starting address of desired data from the file system, and reading the data from the starting address and decoding the data based on the recording format information.

According to still another aspect of the present invention, an optical disc recording apparatus which records data in a certain recording format includes a codec which is capable of compressing/encoding the input data signal in various recording formats, a digital signal processor (DSP) which receives the data signal from the codec and performs a predetermined modulation on the data signal, an amplifier which amplifies the modulated data signal, a pickup which generates a beam and records data on an optical storage medium in response to the amplified data signal, a servo which performs a servo control on the pickup, and a controller which receives a recording format selected by a user through a user interface and informs the codec and the DSP of the selected recording format so as to record the data in the selected recording format.

According to still another aspect of the present invention, an optical disc reproducing apparatus which reproduces data from an optical storage medium on which data is recorded in various recording formats includes a pickup which emits a beam on the optical storage medium and outputs a data signal, an amplifier which amplifies the data signal, a DSP which receives the amplified data signal and performs a predetermined demodulation on the data signal, a codec which decompresses/decodes the demodulated data signal in various recording formats, a servo which performs a servo control on the pickup, and a controller which reads recording format information regarding desired data from the optical storage medium and informs the codec and the DSP of the recording format information so as to reproduce the desired data recorded in the recording format.

According to still another aspect of the present invention, an optical storage medium includes data recorded in a recording format in an area and recording format information recorded in an area adjacent the area containing the data.

According to still another aspect of the present invention, an optical storage medium includes data recorded in various recording formats and file system information recorded in a predetermined area, the file system information including information regarding recording formats and starting addresses of the data.

BRIEF DESCRIPTION OF THE DRAWINGS

These and/or other aspects and advantages of the present invention will become more apparent and more readily appreciated from the following description of embodiments thereof, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 1:
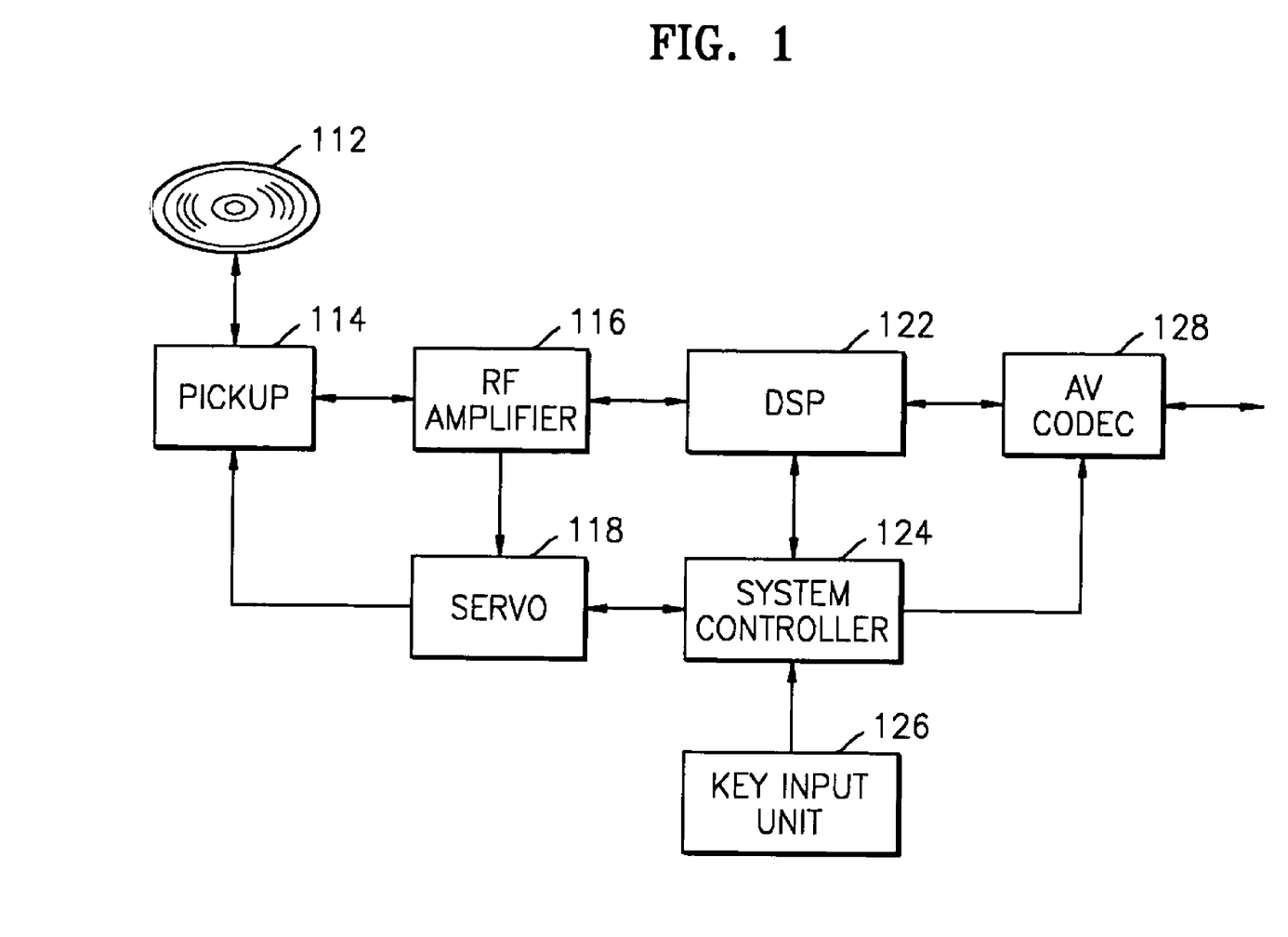
FIG. 1 is a block diagram of an optical disc recording/reproducing apparatus according to an embodiment of the present invention.

FIG. 1 shows a block diagram illustrating an optical disc recording/reproducing apparatus according to an embodiment of the present invention. The structure and operations of the optical disc recording/reproducing apparatus of FIG. 1 will now be explained in relation to a write/read mode.

In the write mode, an audio/video (AV) codec 128 receives AV data from an outside source (not shown), compresses and encodes the AV data in particular units using a particular compressing and encoding system, and provides information (e.g., size and reproduction time) regarding the encoded AV data. Also, the AV codec 128 according to an aspect of the present invention enables data to be compressed and encoded in various recording formats. Thus, a user can easily compress and encode data in a desired recording format using the AV codec 128. Since an encoder/decoder that encodes/decodes data in various recording formats is well known by one of ordinary skill in the art, additional explanations thereof will be omitted here.

A digital signal processor (DSP) 122 adds data required for an error correction coding (ECC) to the data encoded by the AV codec 128 and modules the obtained data using a particular modulating system.

A radio-frequency (RF) amplifier 116 converts electrical data, which is input from the DSP 122, into an optical signal. A pickup 114, which has a built-in actuator (not shown) having focusing and tracking functions, records the optical signal, which is converted by the RF amplifier 116, on a disc 112. A servo 118 receives information required for servo control from the DSP 122, using the RF amplifier 116 and a system controller 124.

When a user selects a recording format using a key input unit 126, the system controller 124 informs the AV codec 128 and the DSP 122 of the selected recording format. Then, the AV codec 128 and the DSP 122 encode and modulate input data in the selected recording format. Next, the data in the selected recording format is recorded on the disc 112 through the RF amplifier 116 and the pickup 114. After completion of the recording, information regarding the recording format of the recorded data is recorded on the disc 112.

In the read mode, the pickup 114 reads the optical signal from the disc 112 using a laser beam. The RF amplifier 116 converts the optical signal output from the pickup 114 into an electrical signal and extracts a servo signal for a servo control and modulated data. The DSP 122 demodulates the data modulated by the RF amplifier 116 and performs an ECC to correct an error contained in the data. The servo 118 receives control information for a servo control from the RF amplifier 116 and the system controller 124, and stably performs the servo control. The AV codec 128 decodes the AV data that is compressed and encoded by the DSP 122.

When a user inputs a command to the system controller 124 using the key input unit 126, the system controller 124 controls the pickup 114, the RF amplifier 116, the DSP 122, and AV codec 128 to reproduce the AV data recorded on the disc 112. During the reproduction of the AV data, the system controller 124 reads a file system of the disc 112 when the disc 112 is determined to be a finalized disc, moves the pickup 114 to the position of a file and reads data contained in the file and information regarding the recording format of the data when a user selects the file. The system controller 124 controls the DSP 122 and the AV codec 128 to reproduce the data recorded in the recording format. While shown as an apparatus that records and reproduces data, it is understood that the apparatus can be only for recording data or only for reproducing data.

Figure 2:
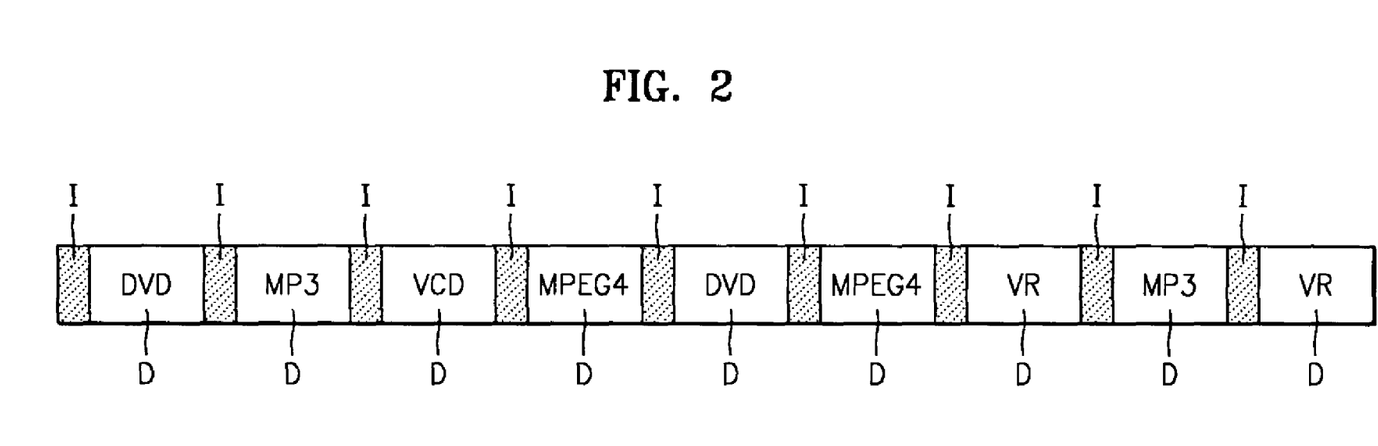
FIG. 2 is a diagram illustrating a data structure in which data is recorded in various recording formats, according to an embodiment of the present invention.

FIG. 2 shows a diagram illustrating a data structure of an optical storage medium in which data is recorded in various recording formats, according to an embodiment of the present invention. Referring to FIG. 2, AV data is recorded on an optical storage medium, for example, a DVD-RW or a DVD-RAM, in various recording formats. That is, as shown in the example in FIG. 2, DVD data, MP3 data, video CD (VCD) data, MPEG4 data, DVD data, MPEG4 data, video recording (VR) data, MP3 data, and VR data can be sequentially recorded on the optical storage medium.

To reproduce data recorded on the optical storage medium in various recording formats, information regarding the various recording formats is required. For this reason, information regarding a recording format must be recorded when recording data on an optical storage medium. There is no limit to an area of the optical storage medium in which the recording format information is recorded.

In the embodiment of FIG. 2, an information area I containing recording format information is formed an area right before each data area D in which data is recorded in a selected format. In the information area I, information regarding attributes of data, such as the size of data and a starting address, may be recorded in addition to the recording format information.

Each recording format information may be recorded in an area right before or after each data area D. Otherwise, according to another aspect, all recording format information may be recorded together in another area of an optical storage medium, such as a lead-in or lead-out area.

Figure 3:
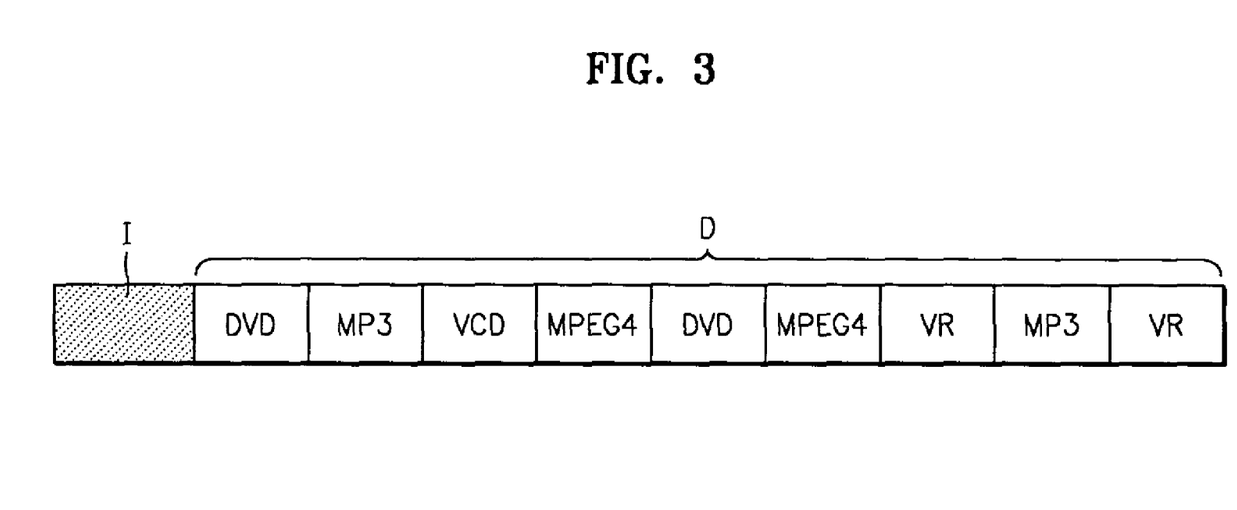
FIG. 3 is a diagram illustrating a data structure in which data is recorded in various recording formats, according to another embodiment of the present invention.

As shown in FIG. 3, the recording format information regarding respective data, as well as information regarding the positions of respective data, can be recorded in a certain area of a recording area of an optical storage medium. For instance, information (e.g., title, starting address, and recording format) regarding each data is recorded in a table format in the certain area. A file system can be stored in an information area I of FIG. 3.

The file system includes respective directories for respective recording formats, and each directory includes information (e.g., title, starting address, recording format type, and data size) regarding data in a particular recording format. If such a file system is prepared and recorded on an optical storage medium, a user can not only obtain information regarding respective data, but also readily select and reproduce desired data from the optical storage medium based on the information.

It is preferable, but not required, that the file system is recorded after completion of all data recording on an optical storage medium. However, for a rewritable disc such as a DVD-RW disc or DVD-RAM, a file system can be prepared every time data is recorded. Although it is preferable that a file system is recorded on a write once disc (e.g., a DVD-R disc) after recording of data on the entire disc, it is possible to prepare a file system every time when data is recorded. Further, it is possible to form respective information areas, which contains respective recording format information, right before respective data areas of an optical storage medium as shown in FIG. 2, and prepare a file system in only a predetermined area of recording areas of the optical storage medium as shown in FIG. 3.

The system controller 124 of the optical disc reproducing apparatus according to an aspect of the present invention reads recording format information recorded in the information area I and appropriately reproduces data recorded on a data area D based on the recording format information.

Figure 4:
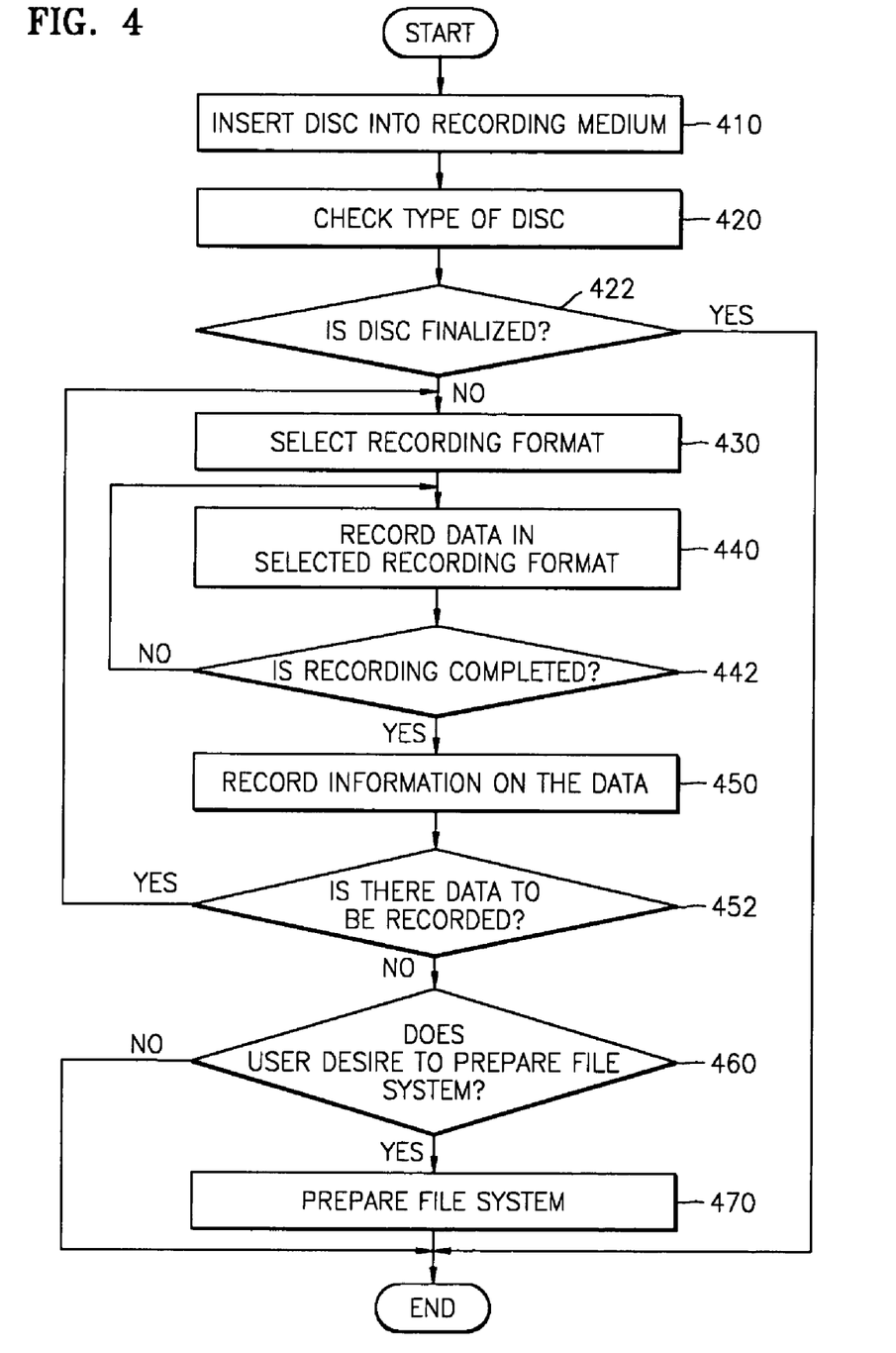
FIG. 4 is a flowchart illustrating a method of recording data in various recording formats, according to an embodiment of the present invention.

FIG. 4 shows a flowchart illustrating a method of recording data in various recording formats on an optical storage medium, according to an embodiment of the present invention. Referring to FIG. 4, when an optical storage medium is inserted into a recording apparatus, the presence of the optical storage medium is checked using a disc detection sensor (operation 410). After the optical storage medium is detected, lead-in information is read from the optical storage medium to check the type of the optical storage medium, for example, whether the optical storage medium is a DVD-RW, a DVD-RAM, or the like (in operation 420).

In operation 422, it is checked whether a file system is present so as to determine whether the optical storage medium is finalized. The finalization of an optical storage medium refers to a process in which a title and information regarding the title are recorded on the optical storage medium. If the finalization of the optical storage medium is confirmed, a recording operation on the optical storage medium is completed.

In operation 430, a desired recording format is selected using a user interface. In operation 430, the user may select from multiple recording formats, such as MPEG2, MPEG4, MP3, audio compression 3 (AC3), and linear pulse code modulation (LPCM). In operation 440, AV data is compressed/encoded and recorded in a data area D of the optical storage medium in the selected recording format.

In operation 442, it is checked whether a recording of the title or data in the selected recording format is completed. If it is determined in operation 442 that the recording operation is completed, information regarding the recording format and the attributes of the recorded data is recorded in an information area I of the disc (in operation 450). The information area I is positioned, for example, right before or after an area where the data is recorded.

In operation 452, it is checked whether a user desires to further record data on the optical storage medium using the user interface. To further record the data, a desired recording format is selected, which may be a different format than previously selected, and operations 440 through 450 are repeated.

If the user desires to record data in various recording formats, the data can be recorded in various recording formats, such as DVD, MP3, VCD, MPEG4, DVD, MPEG4, VR, MP3, and VR, on the optical storage medium as shown in FIG. 2.

Where the recording operation is terminated, it is checked whether the user desires to prepare a file system using a command input to a system controller 124 using a user interface (in operation 460). If it is determined in operation 460 that the command is input to the system controller 124, the system controller 124 performs finalization of the optical storage medium so as to prepare the file system in operation 470. During the finalization of the optical storage medium, the file system is prepared using the information regarding data recorded on the optical storage medium. The file system is used to detect, for example, the title of the data in a certain recording format.

Figure 5:
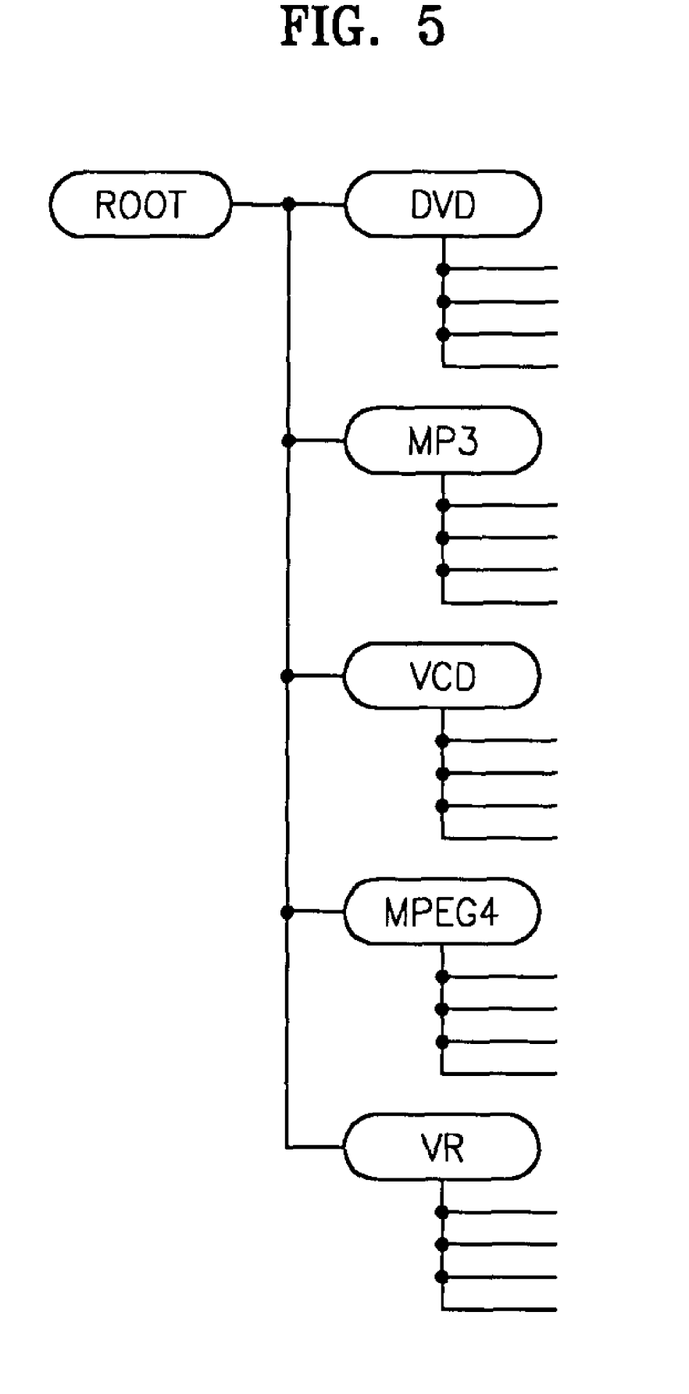
FIG. 5 shows the structure of a directory according to an embodiment of the present invention.

For instance, when data is recorded on the optical storage medium in various recording formats as shown in FIG. 2, the system controller 124 makes directories corresponding to the recording formats for a DVD, a VCD, an MP3, an MPEG4, and a VR. As shown in FIG. 5, directories corresponding to the recording formats for an MP3, a VCD, an MPEG4, and a VR, are further added to a directory related to the DVD format of an existing DVD. The respective main directories include sub directories for the titles of the respective recording formats.

When new data is recorded on the optical storage medium in a recording format, the title of the new data is added to the directory in the recording format. When new data is recorded on the optical storage medium in a new recording format, a directory for the new recording format is prepared. In this way, the existing directories can be updated and a new directory can be added when new data is recorded on the optical storage medium.

Also, a file system may be recorded on a predetermined area of the optical storage medium before the recording of the data.

Figure 6:
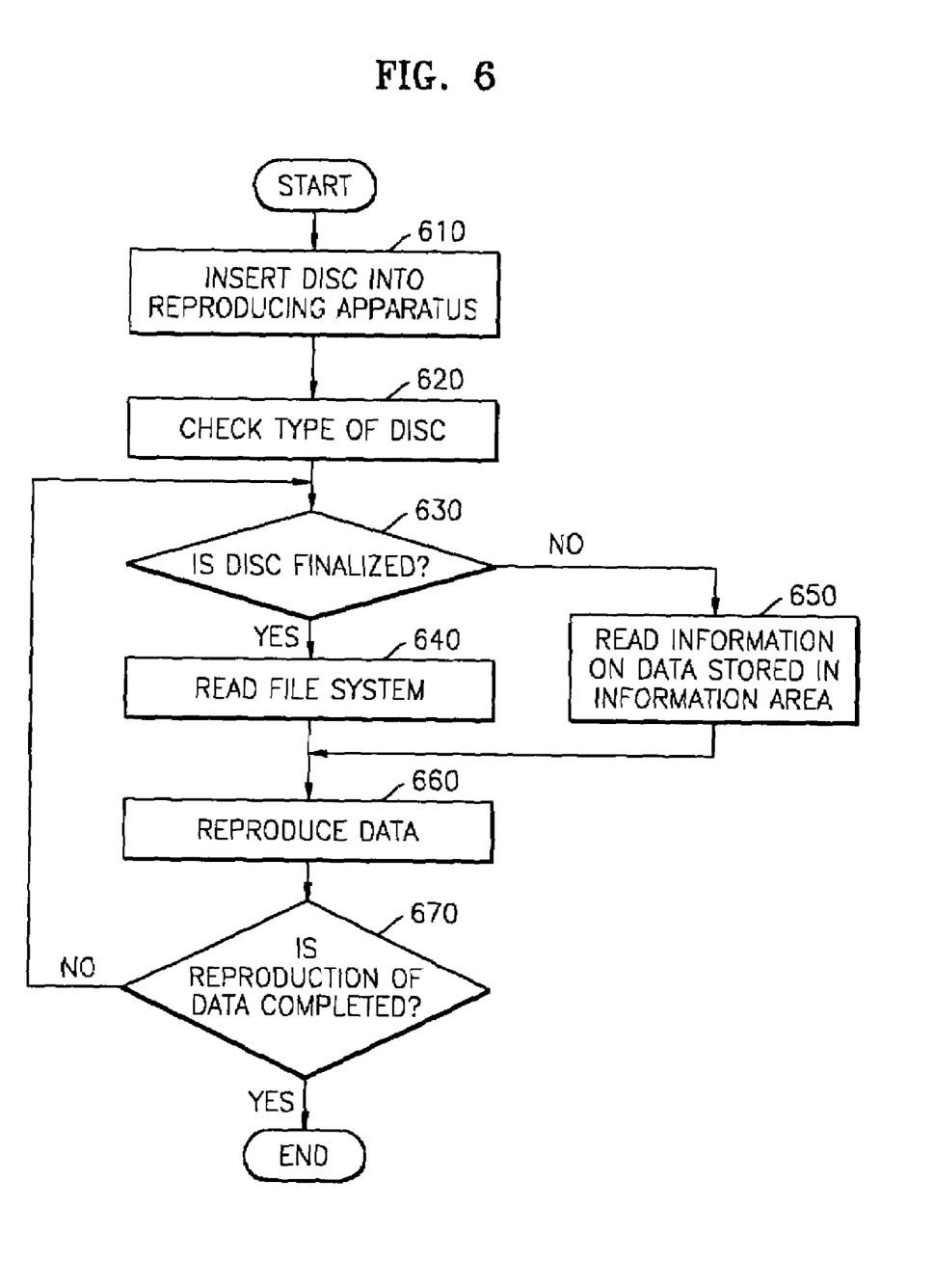
FIG. 6 is a flowchart illustrating a method of reproducing data recorded in various recording formats, according to an embodiment of the present invention.

FIG. 6 shows a flowchart illustrating a method of reproducing data recorded in various recording formats, according to an embodiment of the present invention. Referring to FIG. 6, the presence of a optical storage medium is first checked using a disc detecting sensor whether the optical storage medium is inserted into a reproducing apparatus (in operation 610). In operation 620, after the presence of the optical storage medium is confirmed, the type of the optical storage medium is checked. For example, it is checked whether the optical storage medium corresponds to a DVD-RW, a DVD-RAM, or the like.

In operation 630, the presence of a file system is checked to determine whether the optical storage medium is finalized. If the optical storage medium is yet to be finalized, data recorded on an information area I of the optical storage medium is read (in operation 650). If the optical storage medium is finalized, the file system is read and a root directory is analyzed (in operation 640).

Thereafter, in operation 660, information regarding formats recorded the information area or the file system is read, and desired data is decoded and output based on the read information. Where a command of completing data reproduction is input, the reproduction of the data is completed (in operation 670).

While the present invention has been particularly described with reference to a CD or DVD, it is understood that the present invention can be applied to other storage media. For instance, the present invention can be applied to a high-density recording medium, such as HD-DVD, Blu-ray Discs, Advanced Optical Discs, as well as recording media such as the CD and the DVD.

Further, it is understood that the methods of FIGS. 4 and 6 can be implemented using software (including firmware) encoded on a computer readable medium usable with either a special purpose or a general purpose computer.

As described above, data can be recorded on an optical storage medium, such as a CD-R/AV, a DVD-R/AV, or a DVD-RAM, in recording formats selected by a user regardless of the optical storage medium. Also, the user can easily record the data in a desired recording format regardless of the type of recording medium.

Although a few embodiments of the present invention have been shown and described, it will be appreciated by those skilled in the art that changes may be made in these embodiments without departing from the principles and spirit of the invention, the scope of which is defined in the accompanying claims and their equivalents.

What is claimed is:

1. A method of recording data on an optical storage disc in a certain recording format, the method comprising:
   selecting a disc recording format from a plurality of disc recording formats to record the data on a single surface of a single side of the optical storage disc independent of a type of the optical storage disc;
   recording the data on the single surface of the single side of the optical storage disc in the selected disc recording format; and
   adding information regarding the selected one of the plurality of disc recording formats on the optical storage disc.

2. The method of claim 1, wherein the selected disc recording format to record the data is selected by a user.

3. The method of claim 1, wherein the disc recording format information is recorded in an area adjacent an area in which the data is recorded.

4. A method of recording data on an optical storage medium in a plurality of disc recording formats, the method comprising:
   selecting separate ones of the plurality of disc recording formats for each of the corresponding data to record each of the data on the optical storage medium, the optical storage medium being a single surface of a single side of an optical storage disc;
   recording each of the data on the optical storage medium in the corresponding selected disc recording format; and
   adding information regarding the selected disc recording format to the optical storage medium whenever each data is recorded in the corresponding one of the selected disc recording formats.

5. The method of claim 4, wherein the selected disc recording format corresponding to each of the data is selected by a user.

6. The method of claim 4, wherein the disc recording format information is recorded in an area adjacent each area in which the data is recorded.

7. The method of claim 4, further comprising, after completion of the data recording, preparing and recording file systems.

8. The method of claim 7, wherein the file system is prepared and recorded every time new data is recorded on the optical storage medium.

9. The method of claim 7, wherein the file system is prepared and recorded after completing recording of the data in an entire data area of the optical storage medium.

10. The method of claim 8, wherein:
    the file system comprises directories for the respective disc recording formats,
    each of the directories comprises information regarding attributes of each of the data in the corresponding disc recording format, and
    the attribute information includes a data file name, disc recording format information, and a starting address.

11. A method of reproducing data from an optical storage disc in which data is recorded using a method of claim 1, the method comprising:
    reading disc recording format information regarding desired data from an information area of the optical storage disc distinguished from a plurality of disc recording format information; and
    reproducing the desired data based on the read disc recording format information.

12. A method of reproducing data from an optical storage medium in which data is recorded using a method of claim 7, the method comprising:
    reading data for a file system from the optical storage medium;
    reading a disc recording format information distinguished from a plurality of disc recording format information and a starting address of corresponding desired data from the file system; and
    reading the desired data from the corresponding starting address and decoding the desired data based on the corresponding disc recording format information.

13. An optical storage disc comprising:
    a single side of the disc on which a plurality of data are sequentially recorded on a single surface of the disc in various corresponding disc recording formats such that data of each disc recording format is recorded in a different radial portion of the disc; and
    a predetermined area of the single side of the disc in which file system information is recorded,
    wherein the file system information includes information regarding the various disc recording formats and starting addresses of each of the data.

14. The method of claim 9, wherein:
    the file system comprises directories for the respective disc recording formats,
    each of the directories comprises information regarding attributes of each of the data in the corresponding disc recording format, and
    the attribute information includes a data file name, disc recording format information, and a starting address.

15. A method of reproducing data from an optical storage disc in which data is recorded using a method of claim 2, the method comprising:

reading disc recording format information regarding desired data from an information area of the optical storage disc distinguished from a plurality of disc recording format information; and reproducing the desired data based on the read disc recording format information.

16. A method of reproducing data from an optical storage disc in which data is recorded using a method of claim 3, the method comprising:

reading disc recording format information regarding desired data from an information area of the optical storage disc distinguished from a plurality of disc recording format information; and reproducing the desired data based on the read disc recording format information.

17. A method of reproducing data from an optical storage medium in which data is recorded using a method of claim 4, the method comprising:

reading disc recording format information regarding desired data from an information area of the optical storage medium distinguished from a plurality of disc recording format information; and reproducing the desired data based on the read disc recording format information.

18. A method of reproducing data from an optical storage medium in which data is recorded using a method of claim 5, the method comprising:

reading disc recording format information regarding desired data from an information area of the optical storage medium distinguished from a plurality of disc recording format information; and reproducing the desired data based on the read disc recording format information.

19. A method of reproducing data from an optical storage medium in which data is recorded using a method of claim 6, the method comprising:

reading disc recording format information regarding desired data from an information area of the optical storage medium distinguished from a plurality of disc recording format information; and reproducing the desired data based on the read disc recording format information.

20. A method of reproducing data from an optical storage medium in which data is recorded using a method of claim 8, the method comprising:

reading data for a file system from the optical storage medium;

reading a disc recording format information distinguished from a plurality of disc recording format information and a starting address of corresponding desired data from the file system; and reading the desired data from the corresponding starting address and decoding the desired data based on the corresponding disc recording format information.

21. A method of reproducing data from an optical storage medium in which data is recorded using a method of claim 9, the method comprising:

reading data for a file system from the optical storage medium;

reading a disc recording format information distinguished from a plurality of disc recording format information and a starting address of corresponding desired data from the file system; and reading the desired data from the corresponding starting address and decoding the desired data based on the corresponding disc recording format information.

22. An optical apparatus that transfers data with respect to an optical storage medium, the apparatus comprising:

a pickup that optically transfers encoded data with respect to the optical storage medium;

a data converter which converts a received one of encoded data and data into the other one of the encoded data and the data according to a determined one of a plurality of different recording formats; and a controller which determines a disc recording format selected from a plurality of different disc recording formats and which corresponds to a selected one of the data, controls the data converter to convert the received one of the encoded data and the data according to the determined one of the plurality of different disc recording formats, and controls the pickup to optically transfer the encoded data, wherein the controller controls the pickup to transfer disc recording format information regarding the determined disc recording format with respect to a first region of the optical storage medium, and controls the pickup to transfer the selected data with respect to a second region of the optical storage medium other than the first region, and the first region includes another disc recording format information regarding another one of the plurality of different disc recording formats, and the second region has other data encoded in the another one of the plurality of different disc recording formats, the first and second regions being located on a single surface of a single side of an optical disc.

23. The optical apparatus of claim 22, wherein the first region has a common border with the second region.

24. The optical apparatus of claim 22, wherein the plurality of different disc recording formats includes disc recording formats for at least two of digital versatile disk (DVD) data, MP3 data, video CD (VCD) data, MPEG4 data, video recording (VR) data, MPEG2 data, audio compression 3 (AC3) data, and linear pulse code modulation (LPCM) data.

25. The optical apparatus of claim 22, wherein:

the data converter comprises a decoder which decodes the encoded data read from the optical storage medium into the data according to the determined one of the plurality of different disc recording formats; and the controller reads disc recording format information corresponding to the selected one of the data from the optical storage medium to determine the one the plurality of different disc recording formats, and controls the decoder to decode the encoded data to provide the selected data in the determined one of the plurality of different disc recording formats.

26. The optical apparatus of claim 25, wherein the controller reads a file system from the optical storage medium in which the determined disc recording format information is stored in order to read the recording format information.

27. The optical apparatus of claim 26, wherein the file system further comprises another disc recording format information corresponding to another one of the data encoded using another one of the plurality of different disc recording formats.

28. The optical apparatus of claim 22, wherein:

the data converter comprises an encoder which encodes the data into the encoded data to be written to the optical storage medium according to the determined one of the plurality of different disc recording formats; and the controller controls the encoder to encode the selected one of the data in the determined one of the plurality of different disc recording formats, and controls the pickup to record disc recording format information regarding the determined disc recording format and the encoded data on the optical storage medium.

29. The optical apparatus of claim 28, further comprising a user interface through which a command is received to determine the one of the plurality of different disc recording formats for use in encoding the selected one of the data.

30. The optical apparatus of claim 28, wherein the controller further prepares a file system in which the determined disc recording format information is stored and controls the pickup to record the prepared file system.

31. The optical apparatus of claim 30, wherein the file system further comprises another disc recording format information corresponding to another one of the data encoded using another one of the plurality of different disc recording formats.

32. A computer readable medium encoded with processing instructions for implementing a method of recording data on an optical disc in a disc recording format performed by a computer, the method comprising:

selecting a disc recording format from a plurality of disc recording formats to record the data on the optical disc;

recording the data on a single surface of a single side of the optical disc in the selected disc recording format;

adding disc recording format information regarding the selected one of the plurality of disc recording formats to the single surface of the single side of the optical disc;

selecting another one of the plurality of disc recording formats for additional data to be recorded on the optical disc;

recording the additional data on the single surface of the single side of the optical disc in the corresponding another selected disc recording format; and adding additional disc recording format information regarding the another selected disc recording format to the single surface of the single side of the optical disc.

33. The computer readable medium of claim 32, wherein the method further comprises, after the data and the additional data are recorded, preparing and recording on the single side of the optical disc a file system including the disc recording format information and the additional disc recording format information.

34. A computer readable medium encoded with processing instructions for implementing a method of reproducing data from an optical disc performed by a computer, the method comprising:

reading disc recording format information corresponding to selected data from an information area located on a single surface of a single side of the optical disc distinguished from a plurality of disc recording format information corresponding, respectively, to unselected data also located on the single surface of the single side of the optical disc, but in a different radial portion of the optical disc; and reproducing the selected data based on the read disc recording format information.

35. The computer readable medium of claim 34, wherein:
the reading the disc recording format information comprises:

reading a file system from the optical disc, the file system having files for a plurality of different disc recording information for corresponding different disc recording formats, and reading the disc recording format information distinguished from the plurality of disc recording format information and a starting address corresponding to the selected data from the file system; and the reproducing the selected data comprises reading the selected data from the corresponding starting address and decoding the selected data based on the corresponding disc recording format information.

36. A method of transferring data with respect to an optical storage medium comprising:

converting a received one of data and encoded data to another one of the data and the encoded data using a first disc recording format; and transferring the encoded data with respect to the optical storage medium, wherein the first disc recording format is independent of a type of the optical storage medium on which the encoded data is recorded, and the optical storage medium being a single surface of a single side of an optical storage disc and of the type having a second disc recording format not compatible with the first disc recording format.

37. The method of claim 36, wherein:
the converting the received one of the data and the encoded data comprises encoding the data in the first disc recording format, and
the transferring the encoded data comprises recording the encoded data on the optical storage medium.

38. The method of claim 36, wherein:
the converting the received one of the data and the encoded data comprises decoding the encoded data from the first disc recording format, and
the transferring the encoded data comprises reading the encoded data from the optical storage medium.

39. A method of recording data in a plurality of various recording formats on an optical disc, the method comprising:
recording first data in a first recording format on a first radial portion of the disc and second data in a second recording format on a second radial portion of the disc located on the same side of the optical disc but in a radial location different than the first radial portion, the data being recorded on a single disc surface regardless of a type of the optical disc.

40. The method of claim 39, further comprising:
recording format information of the first data in a first information area and format information of the second data in a second information area, the first and second information area being located on a same side of the optical disc as the data.

41. The method of claim 39, wherein the first recording format and the second recording format are selected by a user.

42. The method of claim 40, wherein the plurality of various recording formats comprise a DVD-video format, an MP3 format, a VCD format, an MPEG4 format, a DVD format and a VR format.

43. The method of claim 40, wherein data in the plurality of various recording formats is sequentially recorded on the single side of the optical disc.

* * * * *

UNITED STATES PATENT AND TRADEMARK OFFICE
CERTIFICATE OF CORRECTION

PATENT NO.        : 7,433,294 B2
APPLICATION NO.   : 10/628468
DATED             : October 7, 2008
INVENTOR(S)       : Sang-am Lee It is certified that error appears in the above-identified patent and that said Letters Patent is hereby corrected as shown below:

Column 1, Line 14, change "2002-4174" to --2002-46174--.

Signed and Sealed this

Thirtieth Day of December, 2008

JON W. DUDAS
*Director of the United States Patent and Trademark Office*